United States Patent
Frank

(10) Patent No.: US 8,943,498 B2
(45) Date of Patent: *Jan. 27, 2015

(54) METHOD AND APPARATUS FOR SWAPPING VIRTUAL MACHINE MEMORY

(75) Inventor: Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 803 days.

This patent is subject to a terminal disclaimer.

(21) Appl. No.: 12/475,540

(22) Filed: May 31, 2009

(65) Prior Publication Data

US 2010/0306770 A1 Dec. 2, 2010

(51) Int. Cl.
*G06F 9/455* (2006.01)

(52) U.S. Cl.
CPC .. *G06F 9/45558* (2013.01); *G06F 2009/45579* (2013.01)
USPC ............................................................ 718/1

(58) Field of Classification Search
CPC ................. G06F 2009/45579; G06F 9/45533; G06F 9/45558
USPC .......... 711/103, 6, 162, 170, 203; 726/24, 22; 710/39, 244; 714/699, 48
See application file for complete search history.

(56) References Cited

U.S. PATENT DOCUMENTS

| 6,681,348 | B1 | | 1/2004 | Vachon |
| 6,854,115 | B1 * | | 2/2005 | Traversat et al. .................. 718/1 |
| 7,529,897 | B1 * | | 5/2009 | Waldspurger et al. ........ 711/162 |
| 7,899,788 | B2 * | | 3/2011 | Chandhok et al. ............ 707/640 |
| 7,925,923 | B1 * | | 4/2011 | Hyser et al. ...................... 714/13 |
| 8,019,789 | B2 * | | 9/2011 | Dahms et al. .................. 707/802 |
| 8,024,566 | B2 * | | 9/2011 | Stanev ........................... 713/167 |
| 8,041,887 | B2 * | | 10/2011 | Ito .................................. 711/103 |
| 8,060,476 | B1 * | | 11/2011 | Afonso et al. ................. 707/649 |
| 8,156,492 | B2 * | | 4/2012 | Dahlstedt ........................... 718/1 |
| 8,365,020 | B2 | | 1/2013 | Laor |
| 8,527,466 | B2 | | 9/2013 | Frank |
| 8,719,642 | B2 | | 5/2014 | Laor |
| 8,726,273 | B2 * | | 5/2014 | Le ..................................... 718/1 |
| 8,730,835 | B2 * | | 5/2014 | Karaoguz et al. ............. 370/254 |
| 8,819,660 | B2 * | | 8/2014 | Fries et al. ..................... 717/168 |
| 2002/0029359 | A1 | | 3/2002 | Kiyoi et al. |
| 2002/0166053 | A1 * | | 11/2002 | Wilson .......................... 713/189 |
| 2004/0088415 | A1 | | 5/2004 | Chandrasekar et al. |
| 2005/0246705 | A1 * | | 11/2005 | Etelson et al. ................ 718/100 |
| 2006/0026585 | A1 | | 2/2006 | Haselden et al. |
| 2006/0143534 | A1 | | 6/2006 | Dall |
| 2006/0230136 | A1 * | | 10/2006 | Ma ................................ 709/224 |

(Continued)

OTHER PUBLICATIONS

REd Hat Enterpise Linux, Deplyment Guide 5.1, Jan. 2008, 1-940.*

(Continued)

*Primary Examiner* — Thomas Lee
*Assistant Examiner* — Aurel Prifti
(74) *Attorney, Agent, or Firm* — Lowenstein Sandler LLP

(57) ABSTRACT

A method and system for swapping memory of a virtual machine are described. In one embodiment, virtual machines are hosted by a server and accessed by remote clients over a network. The server assigns first storage and second storage to each virtual machine, where the first storage is designated for swap memory of a respective virtual machine and the second storage is designated for persistent data of a respective virtual machine. The server monitors events pertaining to the virtual machines. Upon detecting a predefined event pertaining to one of the virtual machines, the server causes the contents of the first storage to be wiped out.

12 Claims, 5 Drawing Sheets

(56) References Cited

U.S. PATENT DOCUMENTS

| | | |
|---|---|---|
| 2007/0006226 A1 | 1/2007 | Hendel |
| 2007/0112812 A1 | 5/2007 | Harvey et al. |
| 2007/0192329 A1 | 8/2007 | Croft et al. |
| 2007/0226443 A1* | 9/2007 | Giampaolo .................. 711/170 |
| 2007/0255926 A1* | 11/2007 | Chuang et al. ................ 711/203 |
| 2007/0271610 A1* | 11/2007 | Grobman ........................ 726/22 |
| 2008/0059785 A1* | 3/2008 | O'Connell ......................... 713/2 |
| 2008/0083030 A1* | 4/2008 | Durham et al. ................. 726/22 |
| 2008/0098161 A1* | 4/2008 | Ito ................................. 711/103 |
| 2008/0127348 A1* | 5/2008 | Largman et al. ................ 726/24 |
| 2008/0162760 A1* | 7/2008 | Jacob ............................. 710/244 |
| 2008/0163008 A1* | 7/2008 | Jacob ............................. 714/699 |
| 2009/0157942 A1* | 6/2009 | Kulkarni ........................... 711/6 |
| 2009/0172409 A1 | 7/2009 | Bullis et al. |
| 2009/0228743 A1* | 9/2009 | Ponnuswamy ................. 714/48 |
| 2009/0234987 A1* | 9/2009 | Lee et al. ........................ 710/39 |
| 2009/0248949 A1 | 10/2009 | Khatri et al. |
| 2010/0083250 A1 | 4/2010 | Nakai |
| 2010/0120529 A1* | 5/2010 | Shimabukuro et al. ......... 463/29 |
| 2010/0235831 A1 | 9/2010 | Dittmer |
| 2010/0251219 A1 | 9/2010 | Peacock et al. |
| 2010/0280997 A1 | 11/2010 | Lillibridge et al. |
| 2010/0306173 A1 | 12/2010 | Frank et al. |
| 2010/0306770 A1 | 12/2010 | Frank et al. |
| 2011/0154133 A1 | 6/2011 | Ganti et al. |
| 2011/0231710 A1 | 9/2011 | Laor et al. |
| 2013/0145218 A1 | 6/2013 | Laor et al. |

OTHER PUBLICATIONS

Qumranet, Solid ICE™, Connection Broker, Apr. 2008, 7 pages.
Qumranet, KVM—Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Desktop Server (VDS), Apr. 2008, 6 pages.
Red Hat Israel, Ltd. Non-Final Office Action for U.S. Appl. No. 12/726,825, mailed Apr. 22, 2011.
Red Hat Israel, Ltd. Final Office Action for U.S. Appl. No. 12/726,825 mailed Sep. 2, 2011.
Red Hat Israel, Ltd. Non-Final Office Action for U.S. Appl. No. 12/726,825, mailed Jan. 5, 2012.
Red Hat Israel, Ltd. Non-Final Office Action for U.S. Appl. No. 12/475,543, mailed Sep. 16, 2011.
Red Hat USPTO, Advisory Action for U.S. Appl. No. 12/726,825 mailed Nov. 7, 2011.
Red Hat USPTU, Final Office Action for U.S. Appl. No. 12/726,825 mailed Apr. 2012.
Red Hat USPTO, Advisory Action for U.S. Appl. No. 12/726,825 mailed Jun. 28, 2012.
Red Hat USPTO, Notice of Allowance for U.S. Appl. No. 12/726,825 mailed Sep. 20, 2012.
Red Hat USPTO, Office Action for U.S. Appl. No. 13/739,411, mailed Sep. 4, 2013.
Red Hat USPTO, Final Office Action for U.S. Appl. No. 12/475,543, mailed Mar. 28, 2012.
Red Hat USPTO, Office Action for U.S. Appl. No. 12/475,543 mailed Sep. 1212.
Red Hat USPTO, Notice of Allowance for U.S. Appl. No. 12/475,543 mailed Jan. 7, 2013.
Red Hat USPTO, Notice of Allowance for U.S. Appl. No. 12/475,543 mailed Apr. 29, 2013.
USPTO, Notice of Allowance for U.S. Appl. No. 13/739,411 mailed Jan. 8, 2014.

* cited by examiner

METHOD AND APPARATUS FOR SWAPPING VIRTUAL MACHINE MEMORY

Embodiments of the present invention relate to management of virtual machines, and more specifically, to swapping virtual machine memory.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the computer.

In some systems, the host is a centralized server that is partitioned into multiple virtual machines to provide virtual desktops to the users. The centralized host manages the allocation of disk storage to the virtual machines. Some hosts pre-allocate a fixed amount of disk storage to each virtual machine. However, a virtual machine often expands and outgrows the pre-allocated storage space. One reason for the expansion is a growing number of swapped pages written to a disk by a virtual machine. Swapped pages are written to a disk when a guest operating system of the virtual machine needs to transfer pages from main memory to disk, in order to clean up the main memory for currently active applications. Presently, there is no efficient mechanism for removing swapped pages created by virtual machines. As a result, the accumulation of the swapped pages in the disk storage can affect the performance of virtual machines and reduce the speed of disk backup operations.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
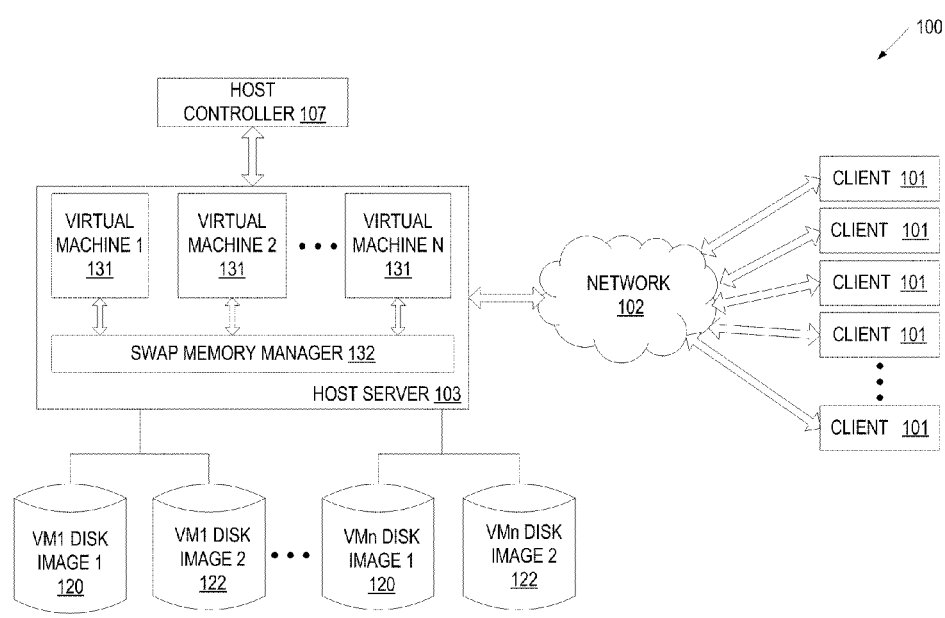
FIG. 1 illustrates an exemplary network architecture in which embodiments of the present invention may operate.

A method and system for swapping memories of virtual machines are described. Virtual machines may be hosted by a server and accessed by remote clients over a network. Each virtual machine is configured to use a separate storage device for swapped pages. The server monitors events pertaining to various virtual machines. Upon detecting a predefined event pertaining to one of the virtual machines, the server causes the swap files of this virtual machine to be whipped out from a corresponding storage device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "de-allocating", "linking", "modifying", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include a host 103 coupled to one or more clients 101 over a network 102. The network 102 may be a private network (e.g., a local area network (LAN), wide area network (WAN), intranet, etc.) or a public network (e.g., the Internet). The host 103 may be coupled to a host controller 107 (via a network or directly). Alternatively, the host controller 107 may be part of the host 103.

In one embodiment, the clients 1 01 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 includes a server or a cluster of servers to run one or more virtual machines 131. Each virtual machine 131 runs a guest operating system (OS) that may be different from one another. The guest OS may include Microsoft Windows, Linux, Solaris, Mac OS, etc. The host 103 may include a hypervisor (not shown) that emulates the underlying hardware platform for the virtual machines 131. The hypervisor may also be known as a virtual machine monitor (VMM), a kernel-based hypervisor or a host operating system.

Each virtual machine 131 can be accessed by one or more of the clients 101 over the network 102. In one scenario, the virtual machine 131 can provide a virtual desktop for the client 101. The virtual machines 131 can be managed by the host controller 107. The host controller 107 may also add a virtual machine, delete a virtual machine, balance the load on the server cluster, provide directory service to the virtual machines 131, and perform other management functions.

The host 103 may also be coupled to data stores hosting images 120 and 122 of storage devices (e.g., disks) that store data of the virtual machines 131. These storage devices (physical storage) may be part of local storage of the host 103 or remote storage (e.g., a storage area network (SAN) or network attached storage (NAS)) coupled to the host 103. The data stores (e.g., repositories) hosting images 120 and 122 may reside on a single or multiple storage devices that may also be part of local storage of the host 103 or remote storage coupled to the host 103. Images 120 and 122 of an individual virtual machine may be stored in one repository or different repositories. In addition, if a virtual machine has two or more users, a separate set of images 120, 122 may be associated with each individual user and may be stored in a single repository or different repositories.

During operation, virtual machines 131 may create persistent data such as user profiles, database records, word processing documents, etc. In addition, guest operating systems create swap files when transferring pages from main memory to disk, in order to clean up the main memory for currently active applications. These swap files accumulate over time and can take up a significant amount of storage space.

Embodiments of the present invention address the above problem by assigning, to each virtual machine 131, one or more disks designated for persistent data and at least one separate disk designated for swap files. In one embodiment, the swap files include hibernate files created by the guest operating system when entering into hibernation. The hibernate files include data reflecting the state of the virtual machine at the time of hibernation.

The disks designated for persistent data and the disks designated for swap files may be of two different types. In particular, the disks designated for swap files may use a significantly cheaper and less redundant (or non-redundant) storage due to the short-lived nature of their contents.

In FIG. 1, images of disks designated for persistent data are shown as virtual machine (VM) disk images 1 (images 122), and images of disks designated for swap memory are shown as VM disk images 2 (images 120). In one embodiment, the guest operating system of each virtual machine 131 is configured to use VM disk images 122 for disk access requests associated with persistent data and to use VM disk images 120 for disk access requests pertaining to swap memory. The disk access requests may include read operations, write operations and delete operations. In other words, the guest operating system of a virtual machine 131 writes swapped pages to a VM disk image 120, and moves swapped pages back to main memory from the VM disk image 120 when needed. The VM disk image 120 may have several swap areas.

In one embodiment, the host 103 includes a swap memory manager 132 that periodically wipes out swap files from VM disk images 120. The swap memory manager 132 may be part of the hypervisor or be controlled by the hypervisor. The swap memory manager 132 may monitor events pertaining to individual virtual machines 131 (e.g., a shutdown event, a restart event, a stand by event, a hibernate event, a hard reboot event, a soft reboot event, etc.). Upon detecting a predefined event (e.g., a shutdown or restart event) pertaining to a specific virtual machine, the swap memory manager 132 causes the swap files of this virtual machine to be removed from a respective disk. For example, the swap memory manager 132 may delete a disk image 120 of this virtual machine and create a new disk image 120 for this virtual machine. Alternatively, the swap memory manager 132 may first select the swap files to be removed (e.g., based on the age of a swap file, the date a swap file was last modified or accessed, etc.), and then remove the selected swap files.

During backup, archive or remote mirroring (e.g., for disaster recovery) operations, the host 103 creates copies of VM disk images 122 but not VM disk images 120. In addition, when creating a new virtual machine that is similar to an existing virtual machine 131, the host 103 does not use the VM disk image 120 for cloning.

With embodiments of the present invention, the amount of storage space utilized by the virtual machines is substantially reduced, and disk backup, archive and remote mirroring operations are simplified and take significantly less time. In addition, by using a cheaper storage for disks designated for swap files, the overall cost of storage devices utilized by the virtual machines is significantly reduced.

Figure 2:
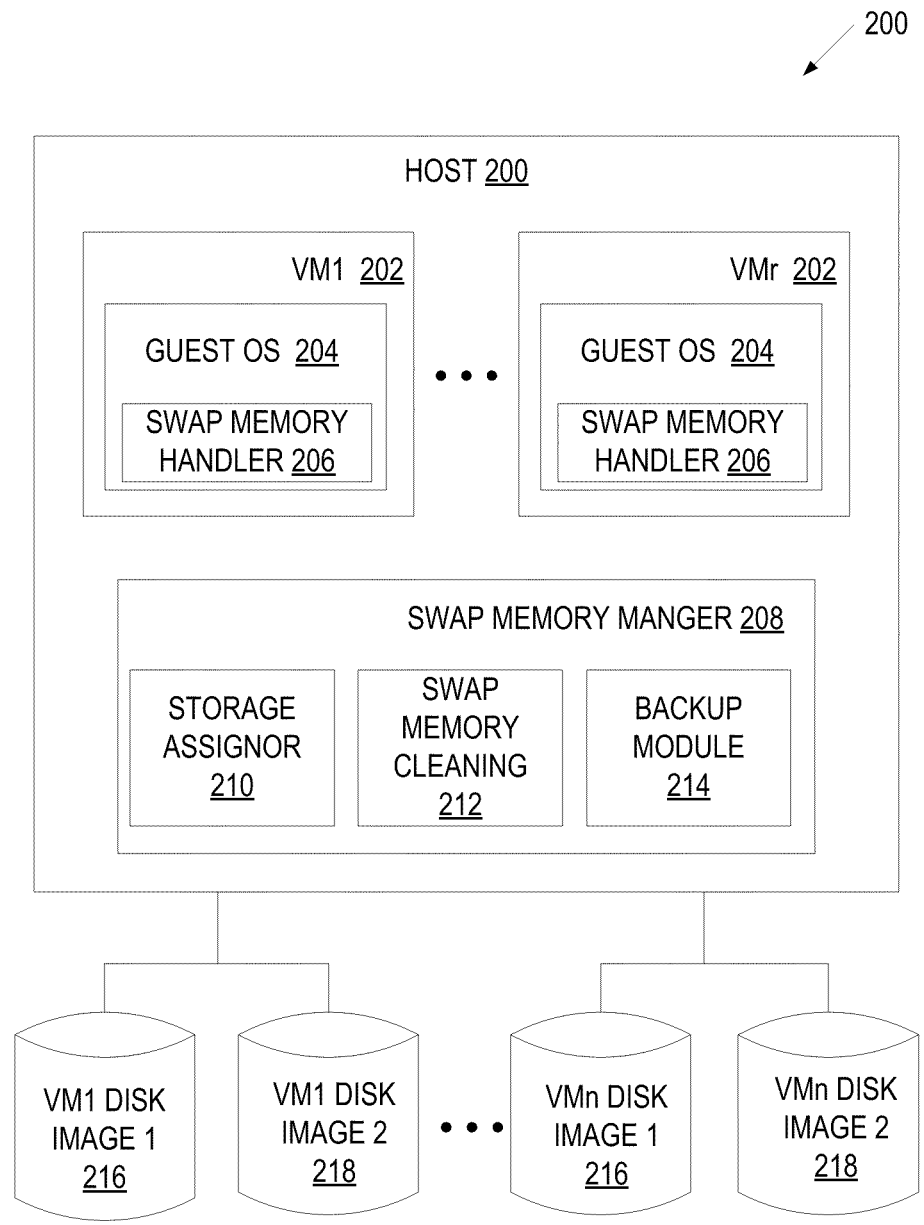
FIG. 2 is a block diagram illustrating one embodiment of a virtual machine and a swapped memory manager.

FIG. 2 is a block diagram of one embodiment of a host 200 that may represent a server or a cluster of servers hosting virtual machines 202. Each virtual machine 202 includes a guest operating system (OS) 204. The guest operating systems 204 can be any operating systems, such as Microsoft Windows, Linux, Solaris, Mac OS, etc. Each guest OS 204 manages a file system for its associated virtual machine 202.

In one embodiment, each guest OS 204 is configured to use a VM disk image 216 for disk access requests associated with swap files, and to use a VM disk image 218 for disk access requests associated with persistent data.

As an example, a Linux guest OS may be configured to format the swap partition using the command "mkswap-L swap1/dev/sdb," where "/dev/sdb" represents the storage device designated for storage of swap data. This command can be optionally used when there is a need to wipe the swap data each boot. In one embodiment, the swap data is wiped at least once, either within the guest OS or outside the guest OS. In another example, a Linux guest OS may be configured to deactivate a previous swap using the command "swapoff-a," and it may be configured to activate a new device for swap data using the command "swapon-L swap1." It should be noted, however, that the above commands are provided for the purpose of illustration only, and various other approaches can be used to provide the described functionality without loss of generality.

The guest OS 204 may include a data operation handler 206 that receives a disk access request from the guest OS 204 and determines whether this request pertains to swap memory. A disk access request pertaining to swap memory may be a write request (e.g., create a new swap file, update an existing swap file or delete a swap file), or a read request to read a swap file (e.g., to move its contents to main memory). If the data operation handler 206 determines that the requested disk access request pertains to swap memory, it performs the requested data operation using the VM disk image 216. If the data operation handler 206 determines that the requested disk access request pertains to persistent data, it performs the requested data operation using the VM disk image 218.

The host 200 includes a hypervisor (not shown) that manages the virtual machines 202. The hypervisor may contain or otherwise control a swap memory manager 208. The swap memory manager 208 may include a storage assignor 210, a swap memory cleaning module 212, and a backup module 214. Alternatively, some or all of the above components may be external to the swap memory manager 208 and may communicate with the swap memory manager 208 via a network or a local means.

The storage assignor 210 allocates storage to a virtual machine being added to the host 200. In particular, the storage assignor 210 assigns, to the virtual machine, one or more disks designated for persistent data and one or more disks designated for swap files. Images (218, 216) of these disks are maintained in a single repository or separate repositories accessible to the swap memory manager 208. In one embodiment, the storage assignor 210 provides a user interface allowing a user (e.g., a system administrator) to assign the above disks to a new virtual machine. Alternatively, the disks are assigned to a new virtual machine automatically.

The swap memory cleaning module 212 monitors events pertaining to individual virtual machines to detect predefined events that trigger cleaning of swap files. The predefined events may be specified by a system administrator (e.g., via a user interface) or hard-coded. Upon detecting a predefined event (e.g., a shut down or restart event) pertaining to a specific virtual machine, the swap memory cleaning module 212 causes the swap files of this virtual machine to be wiped out. This can be accomplished by deleting a disk image 216 of the virtual machine and creating a new disk image 216 for this virtual machine, or by removing all swap files or a subset of swap files from the disk image 216 of the virtual machine. The subset of swap files to be removed can be determined based on, for example, the age of a swap file, the date a swap file was last modified or accessed, etc.

The backup module 214 manages backups and archives of the storage utilized by the virtual machines 202 by including disk images 218, but not disk images 216, in backup and archive operations.

Figure 3:
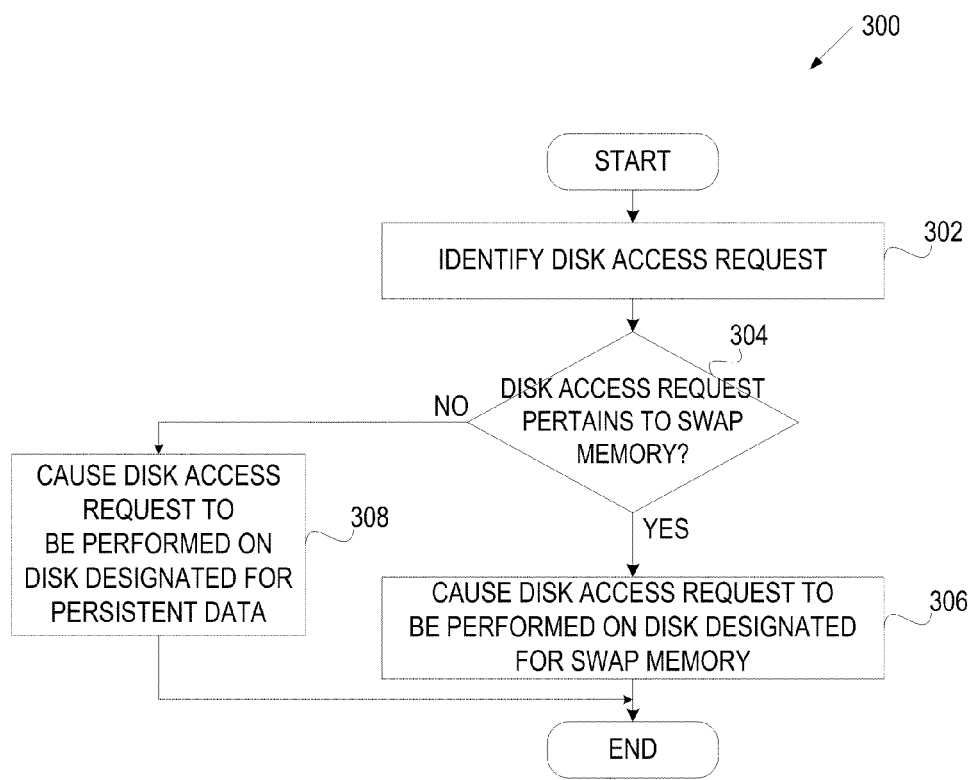
FIG. 3 is a flow diagram illustrating a method for swapping memory of a virtual machine, in accordance with one embodiment of the present invention.

FIG. 3 is a flow diagram illustrating one embodiment of a method 300 for swapping memory of a virtual machine. The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by a guest operating system 204 of a virtual machine 202 (FIG. 2).

Referring to FIG. 3, the method 300 begins with processing logic identifying a disk access request (block 302). The disk access request may be a request of a guest operating system or an application of a virtual machine. The disk access request may be a request to add new data to a disk, update existing data on a disk, or delete existing data from a disk.

At block 304, processing logic determines whether the requested disk access pertains to swap memory. If so, processing logic causes the disk access request to be performed with respect to a disk designated for swap memory of the virtual machine (block 306). In particular, depending on the requested disk access operation, processing logic adds a new swap file to an image of the disk designated for swap memory, updates an existing swap file in the image of the disk designated for temporary files or deletes an existing swap file from the image of the disk designated for temporary files.

Alternatively, if processing logic determines at block 304 that the requested disk access operation pertains to persistent data, processing logic causes the disk access operation to be performed on a disk designated for persistent data of the virtual machine (block 308).

Figure 4:
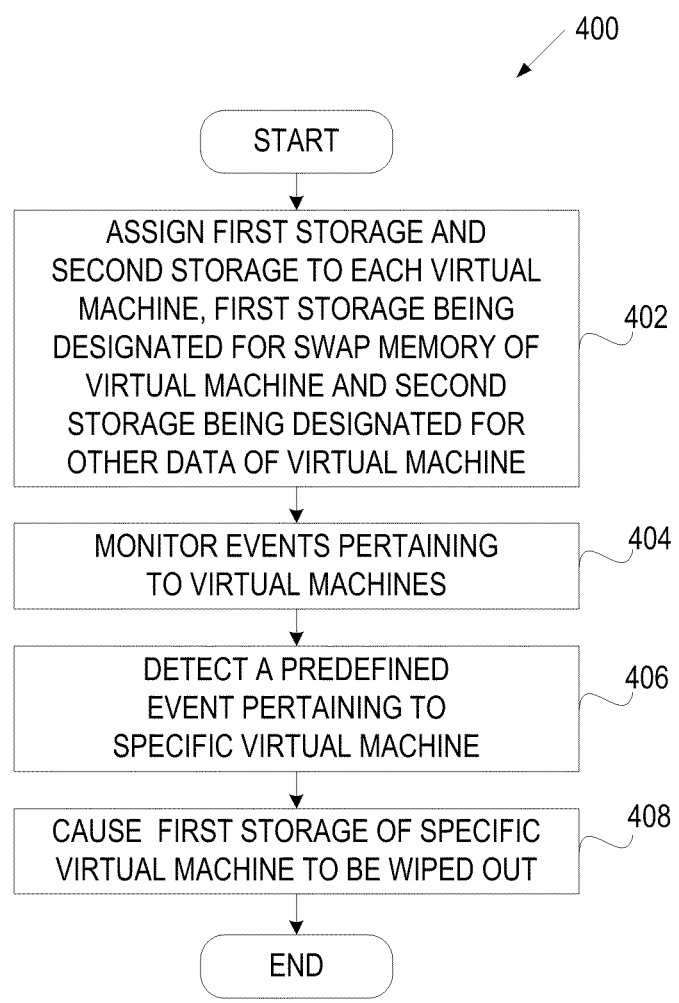
FIG. 4 is a flow diagram illustrating a server-based method for managing swap files of virtual machines, in accordance with one embodiment of the present invention.

FIG. 4 is a flow diagram illustrating one embodiment of a method 400 for managing swap files of virtual machines. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the swap memory manager 132 on the host 103 (FIG. 1).

Referring to FIG. 4, method 400 begins with processing logic assigning a first storage and a second storage to each virtual machine being added to the host (block 402). As discussed above, the first storage is designated for swap memory of a respective virtual machine and the second storage is designated for persistent data of a respective virtual machine. The first storage may be cheaper and require less redundancy than the second storage.

In one embodiment, processing logic also assigns to each virtual machine a third storage for temporary files (web page caches created by a browser application, etc.). Alternatively, temporary files are stored on the first storage or the second storage.

At block 404, processing logic monitors events pertaining to the virtual machines running on the host (e.g., shutdown events, restart events, stand by events, hibernate events, hard reboot events, soft reboot events, etc.). At block 406, processing logic detects a predefined event (e.g., restart or shutdown) pertaining to one of the virtual machines. The event indicates that cleaning of the swap files of the above virtual machine should take place.

At block 408, processing logic causes the swap files of the above virtual machine to be removed from the first storage of this virtual machine. In particular, processing logic can delete a disk image of the first storage of this virtual machine, and create a new disk image for the first storage of the virtual machine. Alternatively, processing logic can delete swap files from the first storage or identify (e.g., based on the age of swap files, the date they were last modified, etc.) a subset of swap files of the virtual machine that should be removed, and then delete this subset from the image of the first storage of the virtual machine.

Figure 5:
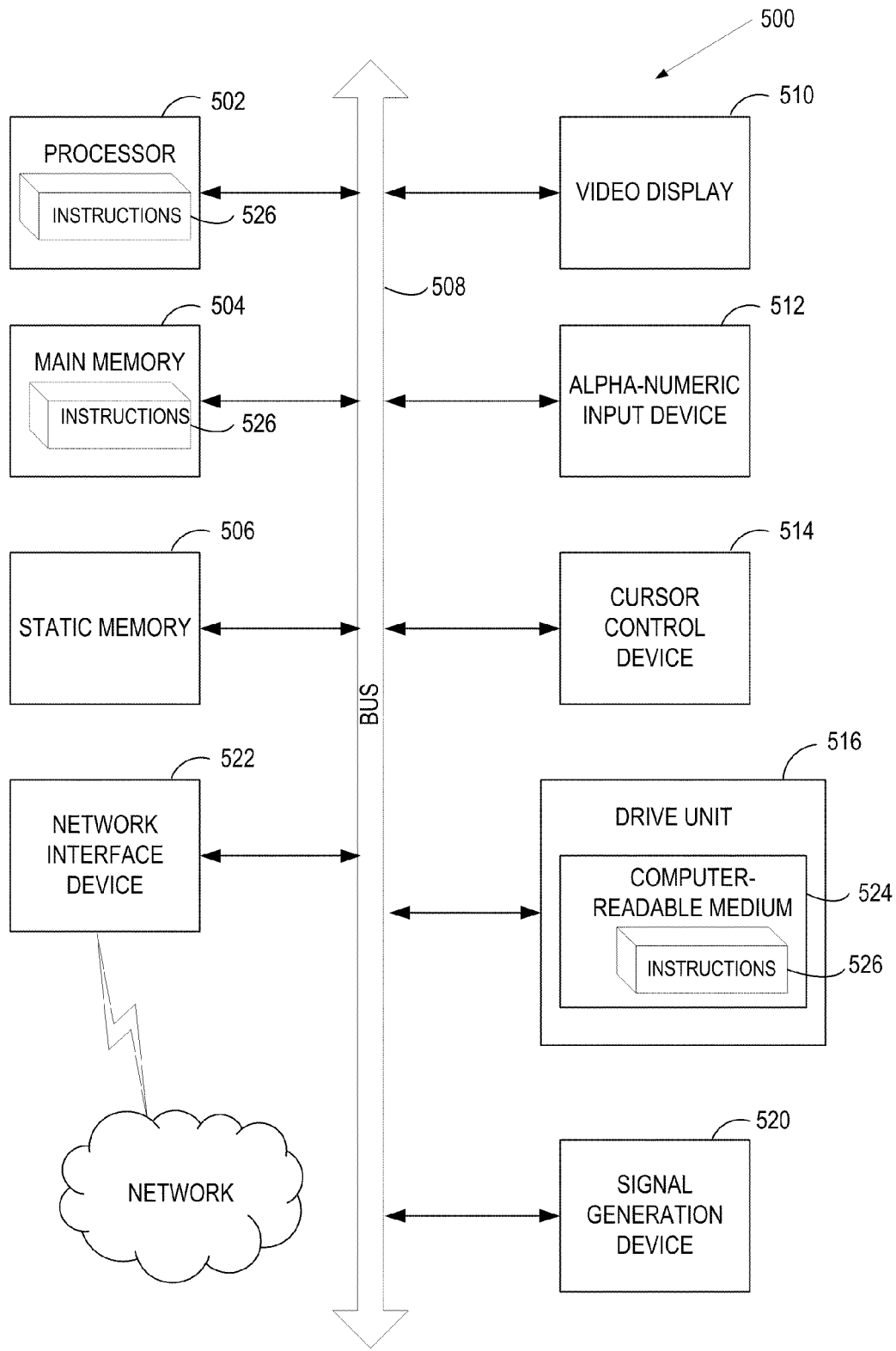
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server (e.g., the host 103) or a client machine (e.g., the client 101) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory 516 (e.g., a data storage device), which communicate with each other via a bus 530.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., processing logic 526) embodying any one or more of the methodologies or functions described herein. The processing logic 526 may also reside, completely or at least partially, within the main memory 504 and/or within the processing device 502 during execution thereof by the computer system 500, the main memory 504 and the processing device 502 also constituting machine-readable storage media. The processing logic 526 may further be transmitted or received over a network via the network interface device 522.

The machine-readable storage medium 524 may also be used to store the swap memory manager 132 of FIG. 1. While the machine-readable storage medium 524 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for a server hosting a plurality of virtual machines, the method comprising:

assigning, by a swap memory manager of the server, a first persistent storage device and a second persistent storage device to each of the plurality of virtual machines, the first persistent storage device designated to swap data and including a first virtual machine disk image for a respective virtual machine, and the second persistent storage device designated to persistent data and including one or more second virtual machine disk images for the respective virtual machine;

monitoring, by the swap memory manager, events pertaining to the plurality of virtual machines, each virtual machine configured to use a corresponding first virtual machine disk image for operations pertaining to the swap memory and to use corresponding second virtual machine disk images for operations pertaining to the persistent data; and upon detecting, by the swap memory manager, an event pertaining to restarting or shutting down of the respective virtual machine, causing, by a processing device, contents of the first virtual machine disk image of the respective virtual machine to be wiped out, wherein contents of the second virtual machine disk images of the respective virtual machine are to be maintained for at least one of a backup, archive, cloning or mirroring operation associated with the respective virtual machine.

2. The method of claim 1, wherein the first persistent storage device and the second persistent storage device are of different storage types.

3. The method of claim 1, wherein causing contents of the corresponding first virtual machine disk image to be wiped out comprises:
   deleting the corresponding first virtual machine disk image; and
   creating a new first virtual machine disk image on the first persistent storage device.

4. The method of claim 1, further comprising:
   performing at least one of the backup, archive and remote mirroring operation for the respective virtual machine, each of the backup, archive and remote mirroring operation refraining from copying the first virtual machine disk image of the respective virtual machine.

5. A system comprising:
   data storage to have a plurality of first virtual machine disk images designated for swap memory and a plurality of second virtual machine disk images designated for persistent data; and
   a host coupled to the data storage to run a plurality of virtual machines, wherein the host further comprises a swap memory manager operable to
      assign at least one first virtual machine disk image and at least one second virtual machine disk image to each virtual machine, each virtual machine configured to use a corresponding first virtual machine disk image for operations pertaining to the swap memory and to use corresponding second virtual machine disk images for operations pertaining to the persistent data,
      monitor events pertaining to the plurality of virtual machines,
      detect an event pertaining to restarting or shutting down of the respective virtual machine, and
      in response to the detected event, cause contents of the first virtual machine disk image of the respective virtual machine to be wiped out, wherein contents of the second virtual machine disk image of the respective virtual machine are to be maintained for at least one of a backup, archive, cloning or mirroring operation associated with the respective virtual machine.

6. The system of claim 5, wherein the first virtual machine disk image and the second virtual machine disk image are stored on storage devices of different storage types.

7. The system of claim 5, wherein the swap memory manager is to cause contents of the corresponding first virtual machine disk image to be wiped by:
   deleting the corresponding first virtual machine disk image; and
   creating a new first virtual machine disk image.

8. The system of claim 5, wherein the swap memory manager is further operable to:
   perform at least one of a backup, archive and remote mirroring operation for one of the plurality of virtual machines, each of the backup, archive and remote mirroring operation refraining from copying a corresponding first virtual machine disk image of the one of the plurality of virtual machines.

9. A non-transitory computer readable storage medium including instructions that, when executed by a server processing system, cause the server processing system to perform a method, comprising:
   assigning, by a swap memory manager of the server, a first persistent storage device and a second persistent storage device to each of the plurality of virtual machines, the first persistent storage device designated to swap data and including a first virtual machine disk image for a respective virtual machine, and the second persistent storage device designated to persistent data and including one or more second virtual machine disk images for the respective virtual machine;
   monitoring, by the swap memory manager, events pertaining to the plurality of virtual machines, each virtual machine configured to use a corresponding first virtual machine disk image for operations pertaining to the swap memory and to use corresponding second virtual machine disk images for operations pertaining to the persistent data; and
   upon detecting, by the swap memory manager, an event pertaining to restarting or shutting down of the respective virtual machine, causing, by a processing device of the server processing system, contents of the first virtual machine disk image of the respective virtual machine to be wiped out, wherein contents of the second virtual machine disk images of the respective virtual machine are to be maintained for at least one of a backup, archive, cloning or mirroring operation associated with the respective virtual machine.

10. The computer readable storage medium of claim 9, wherein the first persistent storage device and the second persistent storage device are of different storage types.

11. The computer readable storage medium of claim 9, wherein causing contents of the corresponding first virtual machine disk image to be wiped out comprises:
   deleting the corresponding first virtual machine disk image; and
   creating a new first virtual machine disk image on the first persistent storage device.

12. The computer readable storage medium of claim 9, wherein the method further comprises:
   performing at least one of the backup, archive and remote mirroring operation for the respective virtual machine, each of the backup, archive and remote mirroring operation refraining from copying the first virtual machine disk image of the respective virtual machine.

* * * * *